(12) United States Patent
Yano et al.

(10) Patent No.: US 7,673,444 B2
(45) Date of Patent: Mar. 9, 2010

(54) EXHAUST GAS PURIFICATION APPARATUS

(75) Inventors: Masakazu Yano, Ageo (JP); Takayuki Adachi, Ageo (JP)

(73) Assignee: Nissan Diesel Motor Co., Ltd., Ageo-shi, Saitama (JP)

(*) Notice: Subject to any disclaimer, the term of this patent is extended or adjusted under 35 U.S.C. 154(b) by 363 days.

(21) Appl. No.: 11/790,758

(22) Filed: Apr. 27, 2007

(65) Prior Publication Data

US 2007/0199309 A1 Aug. 30, 2007

Related U.S. Application Data

(63) Continuation of application No. PCT/JP2005/014061, filed on Aug. 1, 2005.

(30) Foreign Application Priority Data

Oct. 29, 2004 (JP) .............................. 2004-315616

(51) Int. Cl.
*F01N 3/00* (2006.01)
(52) U.S. Cl. .............................. 60/277; 60/276; 60/286; 60/301; 60/303
(58) Field of Classification Search .................. 60/276, 60/277, 286, 301, 303
See application file for complete search history.

(56) References Cited

U.S. PATENT DOCUMENTS 6,079,203 A 6/2000 Wakamoto 6,367,320 B1 4/2002 Kueper et al.

FOREIGN PATENT DOCUMENTS

| JP | H06-173661 | 6/1994 |
|----|------------|--------|
| JP | 9-96215 | 4/1997 |
| JP | 11-81994 | 3/1999 |
| JP | 2000-027627 | 1/2000 |
| JP | 2000-297629 | 10/2000 |
| JP | 2001-3737 | 1/2001 |
| JP | 2002-047979 | 2/2002 |
| JP | 2003-120399 | 4/2003 |
| JP | 2003-232215 | 8/2003 |
| JP | 2004-176719 | 6/2004 |

*Primary Examiner*—Thomas E Denion
*Assistant Examiner*—Diem Tran
(74) *Attorney, Agent, or Firm*—McDermott Will & Emery LLP

(57) ABSTRACT

An exhaust gas purification apparatus includes an NOx reduction catalytic converter disposed in an engine exhaust passage to reductively purify NOx in exhaust gas using ammonia or its precursor as a reducing agent, a first concentration sensor which detects an ammonia concentration in an exhaust gas moving on a downstream side of the NOx reduction catalytic converter, and a control unit which incorporates therein a computer. The control unit conducts calculation to estimate an ammonia concentration in the exhaust gas moving on the downstream side of the NOx reduction catalytic converter, and when a difference between the ammonia concentration detected by the first concentration sensor and the estimated ammonia concentration by the calculation becomes larger than a first predetermined value, determines that the NOx reduction catalytic converter is deteriorated.

7 Claims, 5 Drawing Sheets

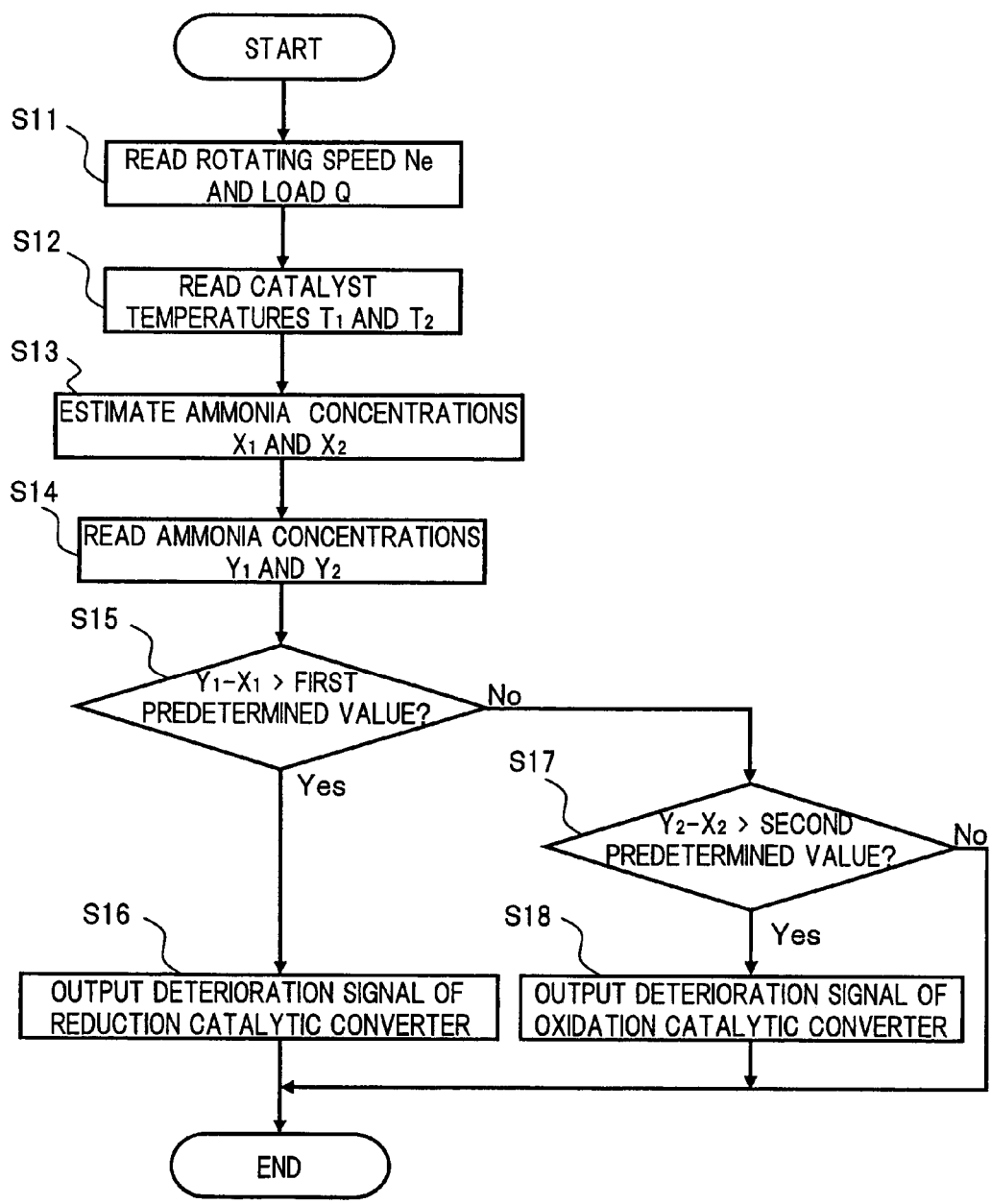

EXHAUST GAS PURIFICATION APPARATUS

This application is a continuation of PCT/JP/2005/014061, filed on Aug. 1, 2005.

BACKGROUND OF THE INVENTION

1. Field of the Invention

The present invention relates generally to an apparatus for purifying an exhaust gas that is exhausted by an engine, and in particular to a technique contrived to detect a deterioration in a reducing catalytic converter incorporated in the exhaust gas purification apparatus, which employs ammonia or its precursor as reducing agent to reduce and purify nitrogen oxide (NOx) in exhaust gas.

2. Description of the Related Art

As catalyst purification system which eliminates NOx in engine exhaust gas, an exhaust gas purification apparatus disclosed in Japanese Unexamined Patent Publication (Kokai) No. 2000-27627 has been proposed. In this conventional exhaust gas purification apparatus, liquid reducing agent is injection-supplied into exhaust gas moving on upstream of a reduction catalytic converter disposed in an engine exhaust gas system in compliance with an engine operating condition. As a result, catalyst reduction reaction between the NOx in the exhaust gas and the liquid reducing agent occurs, so that NOx is purified to become harmless components. As the liquid reducing agent, a urea aqueous solution is employed for inducing hydrolysis that generates ammonia through utilization of exhaust heat and water vapor in the exhaust gas.

A NOx purifying efficiency of the reduction catalytic converter is not semi permanently constant and is gradually lowered due to deterioration with lapse of time and the like. If the liquid reducing agent is injection-supplied into the exhaust gas in compliance with an engine operating condition at the time when the reduction catalytic converter is deteriorated, an amount of ammonia consumed by catalyst reduction reaction is reduced and therefore, the unconsumed ammonia might possibly be exhausted into the atmosphere. Further, when the reduction catalytic converter is deteriorated, the required NOx purifying efficiency may not be exerted, and thus the non-purified exhaust gas is possibly discharged into the atmosphere.

SUMMARY OF THE INVENTION

Therefore, in view of the above-mentioned problems encountered by the conventional catalyst purification system, it is an object of the present invention to provide an exhaust gas purification apparatus, which is able to detect deterioration in a reduction catalytic converter based on an ammonia concentration in an exhaust gas moving on a downstream side of the reduction catalytic converter to thereby eventually prevent any part of the ammonia or non-purified exhaust gas from being discharged into the atmosphere.

To attain the object, in accordance with the present invention, there is provided an exhaust gas purification apparatus which comprises: a reduction catalytic converter disposed in an exhaust passage of an engine and reductively purifies nitrogen oxide in exhaust gas exhausted by the engine using ammonia or its precursor as a reducing agent; a first concentration sensor configured to detect an ammonia concentration in an exhaust gas moving on a downstream side of the reduction catalytic converter; and a control unit incorporating therein an electronic computer, wherein the control unit conducts calculation to estimate an ammonia concentration in the exhaust gas moving on a downstream side of the reduction catalytic converter, and when a difference between the ammonia concentration detected by the first concentration sensor and the estimated ammonia concentration by the calculation becomes larger than a first predetermined value, the control unit determines that the reduction catalytic converter is deteriorated.

According to the exhaust gas purification apparatus of the present invention, the deterioration in the reduction catalytic converter can be detected based on the ammonia concentration in the exhaust gas moving on the downstream side of the reduction catalytic converter.

That is to say, Irrespective of the fact that the reduction catalytic converter has already been deteriorated due to the deterioration with lapse of time, if the reducing agent of which an amount is uniformly determined in compliance with the respective engine operating conditions is injection-supplied, an amount of ammonia consumed by the catalyst reduction reaction is necessarily reduced because of such deterioration of the reduction catalytic converter. Accordingly, the ammonia concentration in the exhaust gas moving on a downstream side of the reduction catalytic converter must increase.

On the other hand, when the reduction catalytic converter is not yet deteriorated and is able to adequately work, the ammonia concentration in the exhaust gas moving on the downstream side of the reduction catalytic converter can be estimated by calculation with a rather small amount of error because of the fact that injection-supply of the reducing agent occurs so as to comply with the respective engine operating conditions.

From the foregoing, it is readily understood that if the deterioration of the reduction catalytic converter has occurred, such deterioration of the reduction catalytic converter can be surely detected by using a fact that a difference between the actual ammonia concentration and the estimated ammonia concentration in the exhaust gas moving on the downstream side of the reduction catalytic converter is larger than a predetermined value.

BRIEF DESCRIPTION OF THE DRAWINGS

FIG. 5 is a flowchart illustrating a deterioration determining process of the exhaust gas purification apparatus according to the second embodiment.

DESCRIPTION OF THE PREFERRED EMBODIMENT

The present invention will be explained in detail below with reference to the accompanying drawings.

Figure 1:
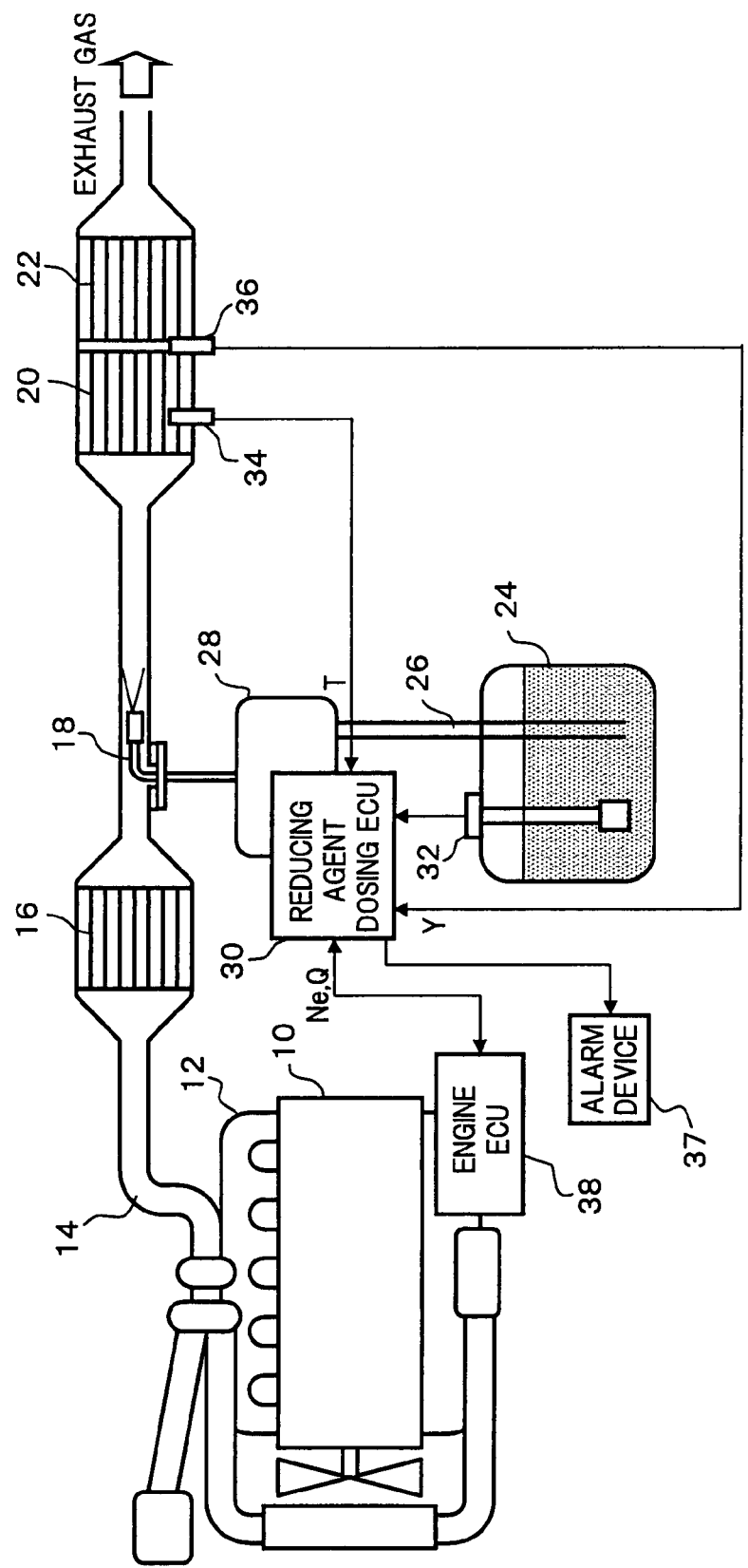
FIG. 1 is a general view illustrating an entire constitution of an exhaust gas purification apparatus according to a first embodiment of the present invention.

FIG. 1 illustrates an exhaust gas purification apparatus according to a first embodiment which purify NOx in an engine exhaust gas by means of catalyst reduction reaction using a urea aqueous solution as precursor of ammonia.

Referring to FIG. 1, there is provided an exhaust pipe 14 which is connected to an exhaust manifold 12 of an engine 10. A nitrogen oxidation catalytic converter 16 which oxidizes nitric oxide (NO) into nitrogen dioxide (NO$_2$), an injection nozzle 18 which injection-supplies a urea aqueous solution, an NOx reduction catalytic converter 20 which reductively purifies NOx using ammonia obtained by hydrolysis of the urea aqueous solution, and an ammonia oxidation catalytic converter 22 which oxidizes the ammonia which has passed through the NOx reduction catalytic converter 20, are each disposed along an exhaust gas moving direction in the exhaust pipe 14. The urea aqueous solution stored in a reducing agent container 24 passes through a charging line 26 whose suction port is opened on the bottom portion of the container 24 so as to be supplied to a reducing agent dosing device 28. The reducing agent dosing device 28 is controlled by a reducing agent dosing control unit (hereinafter, "reducing agent dosing ECU") 30 which incorporates a computer therein, and mixes the urea aqueous solution according to an engine operating condition with air, and at the same time supplies the mixed product to the injection nozzle 18.

Incidentally, a reference numeral 32 in this drawing is a concentration sensor which detects the concentration of the urea aqueous solution stored in the reducing agent container 24 in order to secure the function of the exhaust gas purification apparatus.

In the above-described exhaust gas purification apparatus, the urea aqueous solution that is injection-supplied from the injection nozzle 18 is hydrolyzed by exhaust heat and water vapor in the exhaust gas, and then is transformed into ammonia. It is known that the transformed ammonia reacts with NOx in the exhaust gas in the NOx reduction catalytic converter 20 and is purified to obtain water and a harmless gas. At this time, in order to improve a NOx purifying efficiency in the NOx reduction catalytic converter 20, NO component is oxidized into NO$_2$ component by the nitrogen oxidization catalytic converter 16, and a ratio of NO to NO$_2$ in the exhaust gas is improved so as to be suitable for the catalyst reduction reaction. Further, since the ammonia which has passed through the NOx reduction catalytic converter 20 is oxidized by the ammonia oxidation catalytic converter 22 disposed on a downstream of the catalytic converter 20, the ammonia can be prevented from being discharged directly into the atmosphere.

As a control system which is employed for determining a deterioration in the NOx reduction catalytic converter 20, a temperature sensor of the reduction catalytic converter 34 which detects a catalyst temperature T of the NOx reduction catalytic converter 20 and a concentration sensor 36 (first concentration sensor) which detects an ammonia concentration Y in the exhaust gas moving on a downstream side of the NOx reduction catalytic converter 20 are respectively provided. Output signals from the temperature sensor of the reduction catalytic converter 34 and the concentration sensor 36 are input into the reducing agent dosing ECU 30. Further, the reducing agent dosing ECU 30 is connected to an engine control unit (hereinafter, "engine ECU") 38 via a CAN (controller Area Network), and is configured to be able to appropriately read an engine rotating speed Ne and a load Q to be used for engine control. As the engine load Q, an amount of fuel injection, an inlet flow rate, an inlet negative pressure, a throttle opening and the like can be used. The reducing agent dosing ECU 30 determines whether or not the NOx reduction catalytic converter 20 is deteriorated according to a control program stored in its ROM (Read Only Memory).

Incidentally, the engine ECU 38 which outputs the engine rotating speed Ne and the load Q functions as a rotating speed sensor and a load sensor. Signals from the engine ECU 38 are not used but sensors which respectively detect the rotating speed Ne and the load Q of the engine 10 may be provided (this is applied also to the following description).

Figure 2:
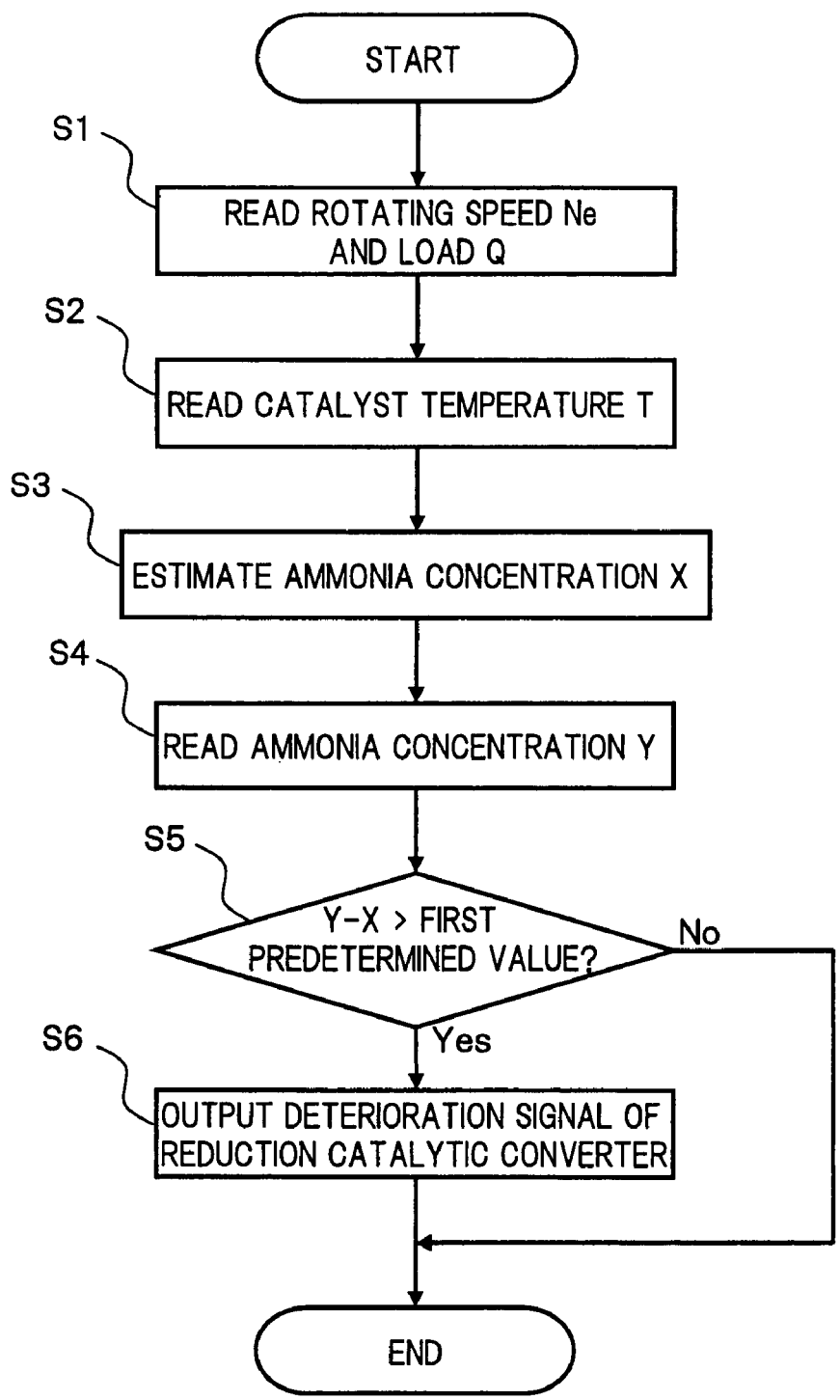
FIG. 2 is a flowchart illustrating a deterioration determining process of the exhaust gas purification apparatus according to the first embodiment.

FIG. 2 is a flowchart illustrating a deterioration determining process which is repeatedly executed in the reducing agent dosing ECU 30 every predetermined time after starting the engine 10.

Referring to FIG. 2, in step 1 designated by reference character "S1" in the drawing (same will be applied to other steps hereunder), the engine rotating speed Ne and the load Q are each read from the engine ECU 38 via the CAN.

In step 2, the catalyst temperature T is read from the temperature sensor of the reduction catalytic converter 34.

Figure 3:
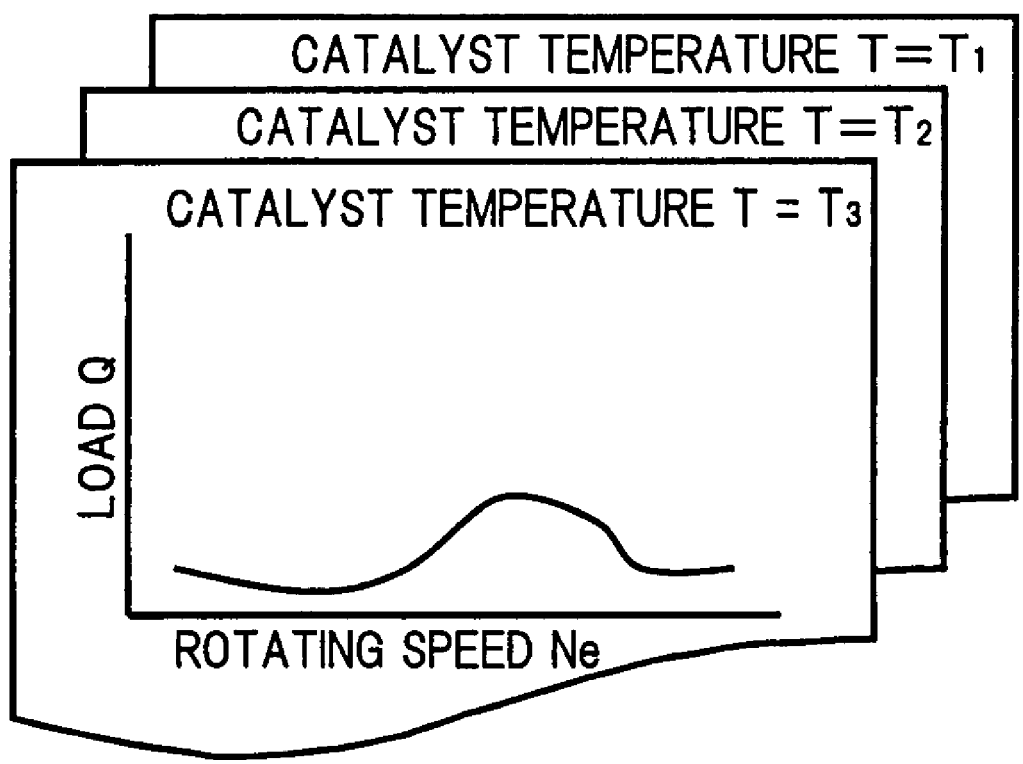
FIG. 3 is an explanatory view of a map for estimating an ammonia concentration.

In step 3, the ammonia concentration X in the exhaust gas moving on the downstream side of the NOx reduction catalytic converter 20 according to the engine operating condition is operated for estimation of the ammonia concentration X. Namely, the engine rotating speed Ne, the load Q and the catalyst temperature T are used as parameters, and a map shown in FIG. 3 is referred to so that the ammonia concentration X in compliance with the engine operating condition is operated for estimation. The ammonia concentration, which is detected on the exhaust downstream side when the NOx reduction catalytic converter 20 is not deteriorated through experiments or the like, is set in the map. In the following explanation, the ammonia concentration which is operated for estimation is called "an estimated ammonia concentration" for the sake of simplicity in explanation.

In step 4, an ammonia concentration Y is read from the concentration sensor 36. Incidentally, in the following explanation, the read ammonia concentration is called "actual ammonia concentration" for the sake of simplicity in explanation.

In step 5, it is determined whether or not a subtraction value (Y-X) obtained by subtracting the estimated ammonia concentration X from the actual ammonia concentration Y is larger than a first predetermined value. The first predetermined value is a threshold for determining whether or not the NOx reduction catalytic converter 20 is deteriorated, and it is appropriately set after an estimation error of the estimated ammonia concentration X or the like is taken into consideration. When the subtraction value (Y-X) is larger than the first predetermined value, the controlling operation proceeds to step 6 (Yes), in this step, the determination is conducted such that the NOx reduction catalytic converter 20 is deteriorated, so that a deterioration signal of the reduction catalytic converter is outputted. It is desirable that the deterioration signal of the reduction catalytic converter is stored in memories such as RAM (Random Access Memory) and EEPROM (Electrically Erasable Programmable Read Only Memory) so as to be referred to at any time. Further, it is desirable that when the determination is made that the NOx reduction catalytic converter 20 is deteriorated, an alarm as a first alarm device 37 is actuated to issue information of the deterioration to be provided to an operator of the engine, e.g., a vehicle driver. On the other hand, when the subtraction value (Y-X) is less than or equal to the first predetermined value, the deterioration determining process is ended (No).

According to the exhaust gas purification apparatus, the deterioration of the NOx reduction catalytic converter 20 can be detected based on the ammonia concentration in the exhaust gas moving on a downstream side of the catalytic converter 20. That is to say, irrespective of the fact that the NOx reduction catalytic converter 20 has already been deteriorated due to the deterioration with lapse of time, if the urea aqueous solution which is uniformly determined in compliance with the respective engine operating conditions is injection-supplied, then, an amount of ammonia consumed by the catalyst reduction reaction is reduced, and as a result, the ammonia concentration in the exhaust gas moving on the downstream side increase.

On the other hand, when the NOx reduction catalytic converter 20 is not yet deteriorated, the ammonia concentration in the exhaust gas moving on the downstream side of the catalytic converter 20 can be estimated with a rather small amount of error. This is because the urea aqueous solution is needed to be injection-supplied so as to comply with the respective engine operating conditions. Therefore, the deterioration in the NOx reduction catalytic converter 20 can be detected by using the fact that the difference between the actual ammonia concentration Y and the estimated ammonia concentration X in the exhaust gas moving on the downstream side of the catalytic converter 20 becomes larger than the first predetermined value when the NOx reduction catalytic converter 20 is deteriorated.

When the rotating speed Ne, the load Q and the catalyst temperature T of the NOx reduction catalytic converter 20 which are closely related to the NOx purifying efficiency are used as the engine operating condition, the ammonia concentration in the exhaust gas moving on the downstream side can be operated for estimation accurately. At this time, the ammonia concentration is operated for estimation by referring to the map where the ammonia concentration is set in relation to the rotating speed Ne, the load Q and the catalyst temperature T. And therefore, for example, when a suitable value is set in the map through experiments, while the accuracy is maintained high, an increase in the estimating and operating load can be suppressed.

Further, when the NOx reduction catalytic converter 20 is deteriorated, the driver is informed of the deterioration. Therefore, for example, the NOx reduction catalytic converter 20 is changed for a new one, so that the function of the exhaust gas purification apparatus may be maintained, and thus NOx which is exhausted into the atmosphere can be reduced as much as possible.

Figure 4:
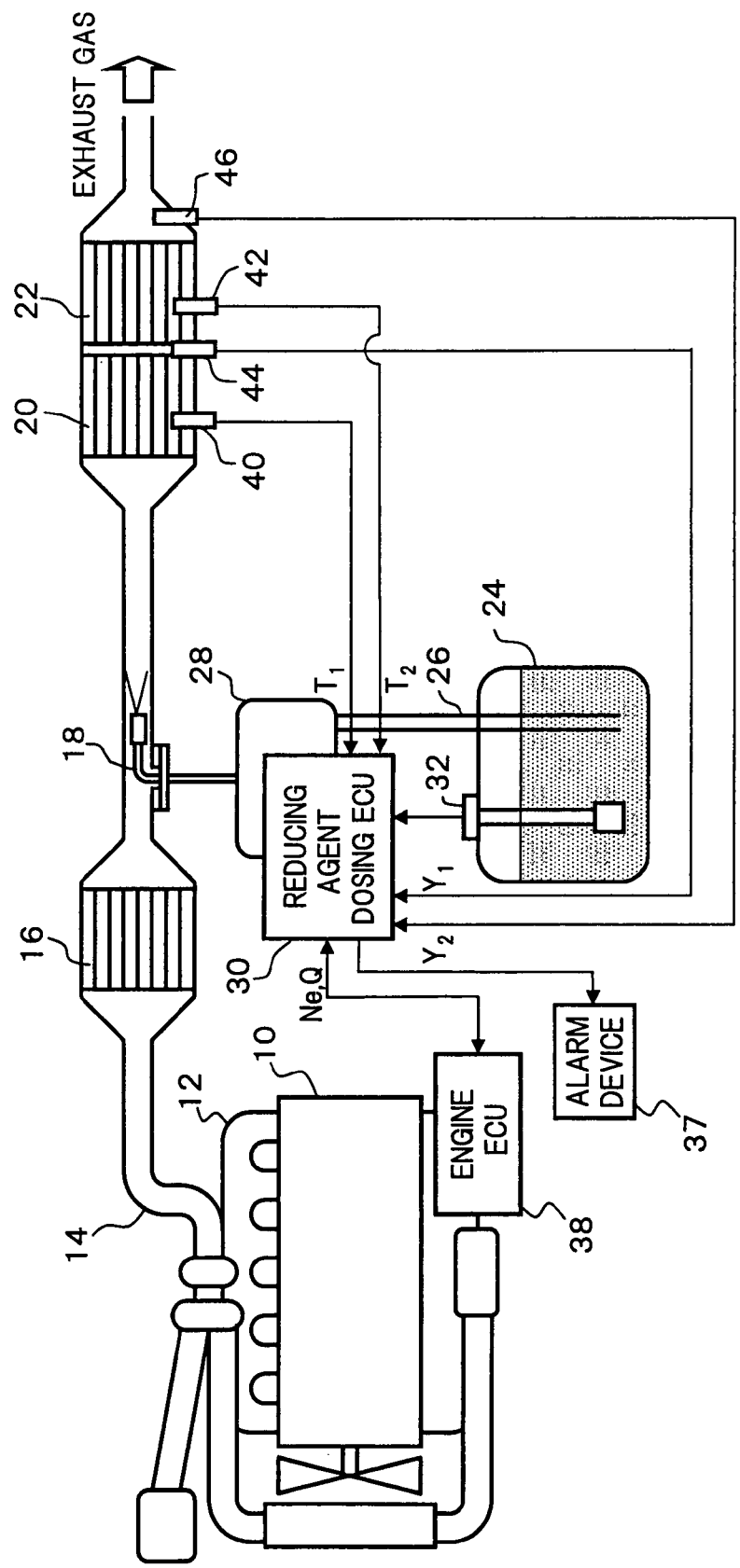
FIG. 4 is a general view illustrating an entire constitution of an exhaust gas purification apparatus according to a second embodiment of the present invention.

An exhaust gas purification apparatus according to a second embodiment is explained below with reference to FIG. 4. In this embodiment, not only the determination of the deterioration in the NOx reduction catalytic converter 20 but also a determination of a deterioration in the ammonia oxidation catalytic converter 22 disposed on the exhaust downstream of the NOx reduction catalytic converter 20 can be made. Since the basic configuration of the exhaust gas purification apparatus is the same as that of the first embodiment, only the control system will be described for explanation purpose.

As the control system which determines the deterioration in the NOx reduction catalytic converter 20 and the ammonia oxidation catalytic converter 22, a temperature sensor of the reduction catalytic converter 40 which detects a catalyst temperature $T_1$ of the NOx reduction catalytic converter 20, a temperature sensor of the oxidation catalytic converter 42 which detects a catalyst temperature $T_2$ of the ammonia oxidation catalytic converter 22, a first concentration sensor 44 which detects an ammonia concentration $Y_1$ in the exhaust gas moving on a downstream side of the NOx reduction catalytic converter 20 and a second concentration sensor 46 which detects an ammonia concentration $Y_2$ in the exhaust gas moving on the downstream side of the ammonia oxidation catalyst 22, are provided. Output signals from the temperature sensor of the reduction catalytic converter 40, the temperature sensor of the oxidation catalytic converter 42, the first concentration sensor 44 and the second concentration sensor 46 are inputted into the reducing agent dosing ECU 30. The reducing agent dosing ECU 30 determines whether or not the NOx reduction catalytic converter 20 and the ammonia oxidation catalytic 22 are deteriorated according to a control program stored in the ROM.

FIG. 5 illustrates a deterioration determining process which is repeatedly executed in the reducing agent dosing ECU 30 every predetermined time after starting the engine 10.

In step 11, an engine rotating speed Ne and a load Q are read from the engine ECU 38 via the CAN.

In step 12, the catalyst temperatures $T_1$ and $T_2$ are read from the temperature sensor of the reduction catalytic converter 40 and the temperature sensor of the oxidation catalytic converter 42, respectively.

In step 13, the ammonia concentrations $X_1$ and $X_2$ according to the engine operating condition in the exhaust gas moving on a downstream side of the NOx reduction catalytic converter 20 and the ammonia oxidation catalytic converter 22 are operated for estimation. Incidentally, the ammonia concentrations $X_1$ and $X_2$ can be operated for estimation by the same method as that in the first embodiment.

In step 14, the ammonia concentrations $Y_1$ and $Y_2$ are read from the first concentration sensor 44 and the second concentration sensor 46, respectively.

In step 15, a determination is made whether or not a subtraction value $(Y_1-X_1)$, obtained by subtracting the estimated ammonia concentration $X_1$ from the actual ammonia concentration $Y_1$ in the exhaust gas moving on downstream side of the NOx reduction catalytic converter 20, is larger than a first predetermined value. Then, when the subtraction value $(Y_1-X_1)$ is larger than the first predetermined value, the determination operation proceeds to step 16 (Yes), and in this step, the determination is made that the NOx reduction catalytic converter 20 is deteriorated, and a reduction catalytic converter deterioration signal is outputted. On the other hand, when the subtraction value $(Y_1-X_1)$ is not more than the first predetermined value, the determination operation proceeds to step 17 (No). Incidentally, similarly to the first embodiment, deterioration signal of the reduction catalytic converter is stored in the memory, and at the same time, when the determination is made that the NOx reduction catalytic converter 20 is deteriorated, the driver is desirably informed of the deterioration (this is applied to the followings).

In step 17, a determination is made whether or not a subtraction value $(Y_2-X_2)$, obtained by subtracting the estimated ammonia concentration $X_2$ from the actual ammonia concentration $Y_2$ in the exhaust gas moving on the downstream side of the ammonia oxidation catalytic converter 22, is larger than a second predetermined value. The second predetermined value is a threshold for determining whether or not the ammonia oxidation catalytic converter 22 is deteriorated, and is appropriately set after an estimated error between the estimated ammonia concentrations $X_1$ and $X_2$ or the like is taken into consideration. When the subtraction value $(Y_2-X_2)$ is larger than the second predetermined value, the proceeding proceeds to step 18 (Yes), and in step 18, the determination is made that the ammonia oxidation catalytic converter 22 is deteriorated, and then, a deterioration signal of the oxidation catalytic converter is outputted. While, when the determination is made that the ammonia oxidation catalytic converter 22 is deteriorated, an alarm as a second alarm device 37 is actuated so as to desirably issue information of the deterioration to be provided to the driver. On the other hand, when the subtraction value $(Y_2-X_2)$ is less than or equal to the second predetermined value, the determination is made that the NOx reduction catalytic converter 20 and the ammonia oxidation catalytic converter 22 are not deteriorated, so that the deterioration determining process is ended (No).

According to the exhaust gas purification apparatus, a determination can be made which of the NOx reduction catalytic converter 20 and the ammonia oxidation catalytic converter 22 is deteriorated based on the principle similar to that in the first embodiment. For this reason, in addition to the function and effect of the first embodiment, when the driver is informed of the deterioration in the ammonia oxidation catalytic converter 22, the catalyst 22 is changed for a new one, for example, so that the function of the ammonia oxidation catalytic converter 22 can be easily maintained. As a result, the discharge of exhaust gas in which ammonia is insufficiently oxidized into the atmosphere can be suppressed.

The present invention is not limited to the exhaust gas purification apparatus in which the urea aqueous solution is used as the reducing agent, and it goes without saying that the present invention can be applied also to apparatuses in which an ammonia aqueous solution is used as the reducing agent.

It should be appreciated that the entire contents of Japanese Patent Application No. 2004-315616, filed on Oct. 29, 2004, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. An exhaust gas purification apparatus, comprising:
a reduction catalytic converter disposed in an exhaust passage of an engine to reductively purify nitrogen oxide in exhaust gas using ammonia or its precursor as a reducing agent;
a first concentration sensor configured to detect an ammonia concentration in an exhaust gas moving on a downstream side of the reduction catalytic converter;
a control unit incorporating therein a computer;
an oxidation catalytic converter disposed on the exhaust downstream side of the reduction catalytic converter to oxidize the ammonia in the exhaust gas; and
a second concentration sensor configured to detect an ammonia concentration in an exhaust gas moving on the downstream side of the oxidation catalytic converter,
wherein the control unit conducts calculation to estimate the ammonia concentration in the exhaust gas moving on the downstream side of the reduction catalytic converter, and when a difference between the ammonia concentration detected by the first concentration sensor and the estimated and operated ammonia concentration becomes larger than a first predetermined value, the control unit determines that the reduction catalytic converter is deteriorated, and
wherein the control unit conducts calculation to estimate the ammonia concentration in the exhaust gas moving on the downstream side of the oxidation catalytic converter, and when a difference between the ammonia concentration detected by the second concentration sensor and the estimated ammonia concentration by the calculation becomes larger than a second predetermined value, the control unit determines that the oxidation catalytic converter is deteriorated.

2. The exhaust gas purification apparatus according to claim 1, further comprising a first alarm device which, when the control unit determines that the reduction catalytic converter is deteriorated, provides information of the deterioration.

3. The exhaust gas purification apparatus according to claim 1, further comprising:
a rotating speed sensor configured to detect a rotating speed of an engine;
a load sensor configured to detect a load of the engine; and
a temperature sensor of the reduction catalytic converter configured to detect a reduction catalytic converter temperature of the reduction catalytic converter,
wherein the control unit conducts calculation to estimate an ammonia concentration in the exhaust gas moving on the downstream side of the reduction catalytic converter in compliance with an engine operating condition based on the rotating speed detected by the rotating speed sensor, the load detected by the load sensor and the reduction catalytic converter temperature detected by the temperature sensor of the reduction catalytic converter.

4. The exhaust gas purification apparatus according to claim 3, wherein the control unit refers to a map in which the ammonia concentration is set according to the rotating speed and the load of the engine and the reduction catalytic converter temperature, to thereby operate for estimation the ammonia concentration in the exhaust gas moving on the downstream side of the reduction catalytic converter in compliance with the engine operating condition.

5. The exhaust gas purification apparatus according to claim 1, further comprising:
a rotating speed sensor configured to detect a rotating speed of the engine;
a load sensor configured to detect a load to the engine; and
a temperature sensor configured to detect a temperature of an oxidation catalytic converter,
wherein the control unit conducts calculation to estimate an ammonia concentration in the exhaust gas moving on a downstream side of the oxidation catalytic converter in compliance with the engine operating conditions based on the rotating speed of the engine detected by the rotating speed sensor, the load detected by the load sensor and the oxidation catalyst temperature detected by the temperature sensor which detects the temperature of the oxidation catalytic converter.

6. The exhaust gas purification apparatus according to claim 5, wherein the control unit refers to a map in which the ammonia concentration is set according to the rotating speed and the load to the engine and the oxidation catalyst temperature to thereby operate for estimation of the ammonia concentration in the exhaust gas moving on the downstream side of the oxidation catalytic converter according to the engine operating condition.

7. The exhaust gas purification apparatus according to claim 5, further comprising a second alarm device which, when the control unit determines that the oxidation catalytic converter is deteriorated, provides information of the deterioration.

* * * * *